US012666242B2

(12) United States Patent     (10) Patent No.:   US 12,666,242 B2
Zeng et al.     (45) Date of Patent:    Jun. 23, 2026

(54) DEVICE DISCOVERY METHOD AND APPARATUS, DEVICES, AND STORAGE MEDIUM

(71) Applicant: GUANGDONG OPPO MOBILE TELECOMMUNICATIONS CORP., LTD., Dongguan (CN)

(72) Inventors: Chunliang Zeng, Dongguan (CN); Zhaoxuan Zhai, Dongguan (CN); Zhigang Yu, Dongguan (CN); Taiyue Wu, Dongguan (CN); Zuo Fan, Dongguan (CN); Hongbo Zhu, Dongguan (CN); Yunfeng Cheng, Dongguan (CN); Jinglin Wei, Dongguan (CN); Zhenrong Yu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 332 days.

(21) Appl. No.: 18/230,510

(22) Filed: Aug. 4, 2023

(65) Prior Publication Data

US 2023/0388767 A1     Nov. 30, 2023

Related U.S. Application Data

(63) Continuation of application No. PCT/CN2022/073474, filed on Jan. 24, 2022.

(30) Foreign Application Priority Data

Feb. 5, 2021   (CN) .......................... 202110164894.8

(51) Int. Cl.
    *H04W 48/16*       (2009.01)
    *G06F 3/048*       (2013.01)
          (Continued)

(52) U.S. Cl.
    CPC ......... *H04W 8/005* (2013.01); *H04W 12/041* (2021.01)

(58) Field of Classification Search
    CPC ..... H04W 8/005; H04W 4/80; H04W 12/041; H04W 48/16; H04W 8/186; H04W 84/10;
         (Continued)

(56) References Cited

U.S. PATENT DOCUMENTS 9,936,444 B2 *   4/2018   Knowles ............... H04W 48/08
10,237,891 B1 *   3/2019   Chu ...................... H04W 48/16
         (Continued)

FOREIGN PATENT DOCUMENTS

CN     101009687 A     8/2007
CN     102821466 A     12/2012
         (Continued)

OTHER PUBLICATIONS

International Search Report and Written Opinion dated Apr. 14, 2022 in International Application No. PCT/CN2022/073474. English translation included.

(Continued)

*Primary Examiner* — Edan Orgad
*Assistant Examiner* — Vanneilian Lalchinthang
(74) *Attorney, Agent, or Firm* — Sheppard, Mullin, Richter & Hampton LLP

(57)             ABSTRACT

Device discovery methods, a first device, and a non-transitory computer-readable storage medium are provided. The method is performed by the first device and includes: interacting with a second device by means of n management frames, at least one of the n management frames including a customized field, and n being a positive integer; and acquiring device information of the second device based on a customized field in a first management frame. The first management frame is a management frame transmitted by (Continued)

First device

Second device 201, the first device interacts with a second device by means of n management frames, at least one of the n management frames including a customized field, and n being a positive integer 202, acquiring device information of the second device based on a customized field in a first management frame, the first management frame being a management frame transmitted by the second device among the at least one of the n management frames the second device to the first device among the at least one of the n management frames.

20 Claims, 10 Drawing Sheets

(51) Int. Cl.

| | | |
|---|---|---|
| *H04L 12/26* | (2006.01) | |
| *H04L 29/08* | (2006.01) | |
| *H04W 8/00* | (2009.01) | |
| *H04W 12/041* | (2021.01) | |

(58) Field of Classification Search
CPC ....... H04W 48/12; H04W 8/24; H04W 80/02; H04W 84/12; H04W 88/08; H04W 74/002; H04W 88/10; H04L 12/12; H04L 67/1046; H04L 69/22; H04L 67/303; H04B 7/0452; G06F 8/65; F24F 11/30; G05B 15/02
USPC ......................................................... 370/329
See application file for complete search history.

(56) References Cited

U.S. PATENT DOCUMENTS

| | | | | |
|---|---|---|---|---|
| 11,224,006 | B2 * | 1/2022 | Ljung ................... | H04L 5/0048 |
| 11,418,388 | B2 * | 8/2022 | Wang .................... | H04L 63/083 |
| 12,192,885 | B2 * | 1/2025 | Zhao ..................... | H04W 24/02 |
| 2013/0227152 | A1 * | 8/2013 | Lee ....................... | H04W 8/186 |
| | | | | 709/227 |
| 2014/0254479 | A1 * | 9/2014 | Abraham ................ | H04W 4/70 |
| | | | | 370/328 |
| 2015/0282229 | A1 * | 10/2015 | Vedula .................. | H04W 76/14 |
| | | | | 370/338 |
| 2016/0147994 | A1 * | 5/2016 | Lu ........................ | H04L 63/0853 |
| | | | | 726/26 |
| 2017/0086251 | A1 * | 3/2017 | Valliappan ............ | H04W 72/54 |
| 2019/0150063 | A1 * | 5/2019 | Chu ........................ | H04L 69/22 |
| | | | | 370/338 |
| 2020/0145923 | A1 * | 5/2020 | Park .................... | H04W 40/244 |
| 2022/0272399 | A1 * | 8/2022 | Zhang .............. | H04M 1/72412 |

FOREIGN PATENT DOCUMENTS

| | | |
|---|---|---|
| CN | 104426626 A | 3/2015 |
| CN | 105873202 A | 8/2016 |
| CN | 207652705 U | 7/2018 |
| CN | 109104744 A | 12/2018 |
| CN | 110995665 A | 4/2020 |
| EP | 3823250 A1 | 5/2021 |
| EP | 3883299 A1 | 9/2021 |
| WO | 2020133467 A1 | 7/2020 |

OTHER PUBLICATIONS

Qualcomm Inc. "Signaling Details for ProSe Direct Discovery" 3GPP TSG-RAN WG2 #86 R2-142540, vol. No. May 9, 2014 (May 9, 2014).ISSN:, entire document.

The First Office Action from corresponding Chinese Application No. 202110164894.8, dated Mar. 27, 2024. English translation attached.

Second Office Action for Chinese Application No. 202110164894.8 mailed Jan. 14, 2025 (14 pages).

Extended European Search Report for European Patent Application No. EP22748925.9 dated Jun. 24, 2024.

Chinese Third Office Action, Chinese Application No. 202110164894.8, mailed May 31, 2025 (16 pages).

* cited by examiner 31 32 33 34 35

| Tag Number | Length | OUI | Type | DATA |

41 42

| Tag Number | Length | OUI | Type1 | DATA | Tag Number | Length | OUI | Type1 | DATA |

51 52 53 54 55 56

| Tag Number | Length | OUI | Type=0x00 | Vendor OUI | DATA |

DEVICE DISCOVERY METHOD AND APPARATUS, DEVICES, AND STORAGE MEDIUM

CROSS-REFERENCE TO RELATED APPLICATIONS

The present application is a continuation of International Application No. PCT/CN2022/073474 filed on Jan. 24, 2022, which claims priority to Chinese Patent Application No. 202110164894.8 filed on Feb. 5, 2021, both of which are herein incorporated by reference in their entirety.

TECHNICAL FIELD

Embodiments of the present disclosure relate to communication technology, and more particularly, to device discovery methods, a first device, and a non-transitory computer-readable storage medium.

BACKGROUND

Device discovery refers to a process in which a first device acquires presence of a second device.

In the related art, the device discovery is performed by the second device through an Access Point (AP) function. Exemplarily, a beacon frame is broadcasted by the second device and carries a Service Set Identifier (SSID) field. Device information of the second device is learned by the first device through the SSID field, thus discovering the second device.

SUMMARY

In an aspect, a device discovery method is provided according to an embodiment of the present disclosure. The method is performed by a first device and includes: interacting with a second device by means of n management frames, at least one of the n management frames including a customized field, and n being a positive integer; and acquiring device information of the second device based on a customized field in a first management frame. The first management frame is a management frame transmitted by the second device among the at least one of the n management frames.

In another aspect, a device discovery method is provided according to an embodiment of the present disclosure. The method is performed by a second device and includes interacting with a first device by means of n management frames. At least one of the n management frames includes a customized field, and n is a positive integer. The at least one of the n management frames includes a first management frame transmitted by the second device, and a customized field in the first management frame is configured to carry device information of the second device.

In yet another aspect, a first device is provided according to an embodiment of the present disclosure. The first device includes a processor and a transceiver. The transceiver is configured to interact with a second device by means of n management frames. At least one of the n management frames includes a customized field, and n is a positive integer. The processor is configured to acquire device information of the second device based on a customized field in a first management frame. The first management frame is a management frame transmitted by the second device among the at least one of the n management frames.

In yet another aspect, a non-transitory computer-readable storage medium is provided according to an embodiment of the present disclosure. The computer-readable storage medium stores a computer program therein. The computer program, when loaded and executed by a processor, implements the device discovery method according to the above aspects.

BRIEF DESCRIPTION OF DRAWINGS

In order to make the technical solution described in embodiments of the present disclosure more clearly, the drawings used for description of embodiments will be described. Apparently, the drawings in the following description are only some embodiments of the present disclosure. For those skilled in the art, other drawings may be acquired according to the drawings without any creative work.

DESCRIPTION OF EMBODIMENTS

In order to make the objects, technical solutions, and advantages of the present disclosure more apparent, the embodiments of the present disclosure will be described in further detail below in conjunction with the accompanying drawings.

Figure 1:
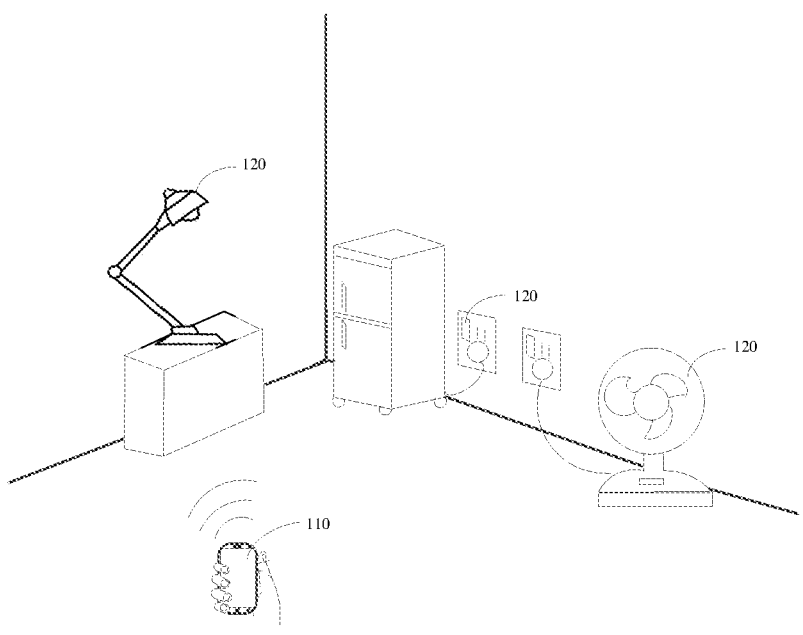
FIG. 1 is a schematic diagram of an Internet of Things (IoT) system according to an exemplary embodiment of the present disclosure.

FIG. 1 is a schematic diagram of an Internet of Things (IoT) system according to an embodiment of the present disclosure. As illustrated in FIG. 1, the IoT system may include a first device 110 and a second device 120.

The first device 110 is an electronic device having a device discovery function and may be a terminal such as a smart phone, a tablet computer, and a portable computer, or an IoT device having a function of discovering other IoT devices, like a smart speaker. As illustrated in FIG. 1, as an example, the first device 110 is the smart phone for description.

In some embodiments, device discovery on the second device 120 is achieved by the first device 110 through an installed IoT Application. The device discovery on a plurality of second devices 120 may be achieved by the IoT application.

The second device 120 may include a smart home device, a smart appliance, a smart sensor, and the like. In FIG. 1, the second device 120 includes a smart table lamp, a smart socket, and a smart fan. The embodiments of the present disclosure do not limit a specific device type of the second device 120.

In at least one embodiment, data instruction interaction may be directly performed between the first device 110 and the second device 120. For example, the data instruction interaction is performed between the first device 110 and the second device 120 through a management frame. A type of the management frame includes, but is not limited to, a Beacon frame, an Action frame, and a Probe frame.

In at least one embodiment, the first device 110 has a provisioning capability. After the second device 120 is discovered by the first device 110 through the device discovery, provisioning performed on the second device 120 is supported by the first device 110, thereby enabling the second device 120 to connect to a wireless network scanned by the first device 110.

In the related art, the device discovery is performed by a second device through an Access Point (AP) function. Exemplarily, the beacon frame is broadcasted by the second device and carries a Service Set Identifier (SSID) field. Device information of the second device is learned by a first device through the SSID field, thus discovering the second device.

In an aspect, according to rules in a standard, a maximum length of the SSID field is 32 bytes, such that the device information transmitted by the second device is very limited. In this solution, the second device is limited when it wants to indicate its device information in more detail.

In another aspect, this solution has limitations in terms of how it can be implemented for some second devices that support no AP function or for second devices supporting the AP function but being unable to perform device discovery through this solution when not currently operating in an AP mode.

In another aspect, for the first device, as long as the beacon frame broadcasted by the second device can be scanned, the second device is considered to have been discovered and alerted to the user. Since transmission at a predetermined distance is supported by the beacon frame broadcasted by the second device, a case where a second device not belonging to the user is discovered by the first device is possible to occur. For example, a neighbor's device is discovered. Therefore, it is possible to cause a disturbance for the user to some extent and to affect a user experience.

In the method according to an embodiment of the present disclosure, a customized field is added in the management frame transmitted by the second device, which facilitates the second device to transmit more pieces of device information to the first device through the customized field, thereby enabling more efficient and more accurate device discovery.

Meanwhile, for the first device, home-returning scenario awareness and distance determination logic are added. With the home-returning scenario awareness, the first device starts to enter a device discovery state under a home-returning scenario, thereby reducing the disturbance to the user and saving electric quantity of the first device. Through the distance determination logic, devices that are too far away from each other and may belong to other users are not prompted. Therefore, a second device belonging to the user is discovered more exactly, thereby enhancing the user experience.

The technical solutions of the present disclosure will be introduced and explained below with reference to a number of exemplary embodiments.

Figure 2:
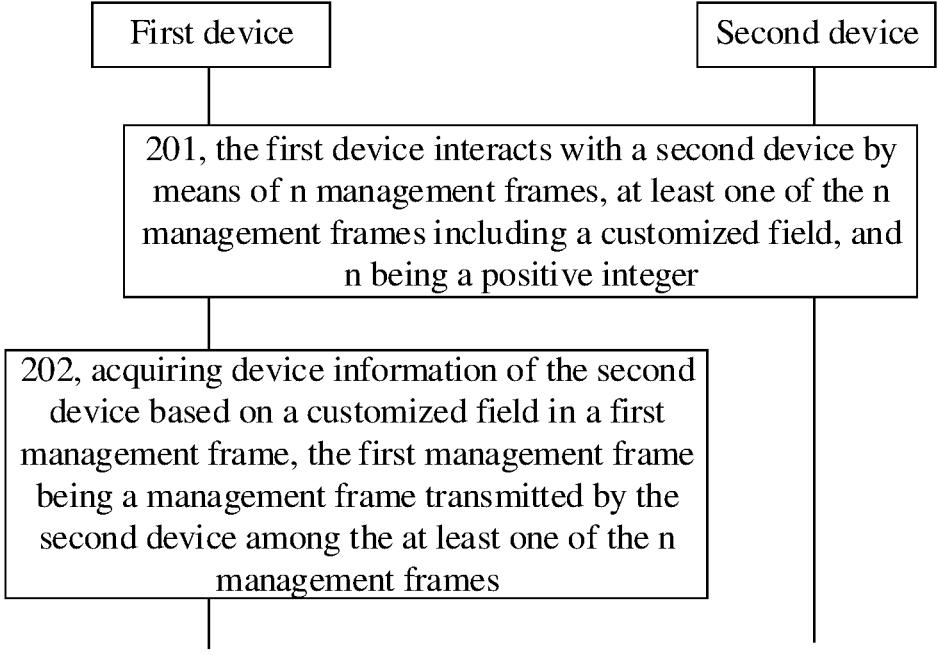
FIG. 2 is a flowchart of a device discovery method according to an exemplary embodiment of the present disclosure.

FIG. 2 is a flowchart of a device discovery method according to an embodiment of the present disclosure. As illustrated in FIG. 2, the method may be performed by the IoT system illustrated in FIG. 1 and may include the following step.

At step 201, the first device interacts with the second device by means of n management frames. At least one of the n management frames includes the customized field, and n is a positive integer.

The Management Frame is a type of frame defined in the Institute of Electrical and Electronics Engineers (IEEE) 802.11 and is mainly used to manage the IoT device to connect to or disconnect from the wireless network. In an embodiment of the present disclosure, the first device interacts with the second device through the management frame to perform device discovery, thereby enabling the first device to discover the second device. In at least one embodiment, after the second device is discovered by the first device, the provisioning is performed by first device on the second device, thereby enabling the second device to connect to the wireless network.

In an embodiment of the present disclosure, the number n of management frames that the first device interacts with the second device for device discovery may be 1 or more. In an implementation, the operation that the first device interacts with the second device by means of the n management frames includes: broadcasting, by the first device, a second management frame, and receiving, by the second device, the second management frame; and transmitting, by the second device, a first management frame to the first device, and receiving, by the first device, the first management frame. In another implementation, the operation of the first device interacting with the second device by means of the n management frames includes: broadcasting, by the second device, the first management frame, and receiving, by the first device, the first management frame.

In the n management frames, there is at least one management frame including the customized field. The customized field is a field that redefines the use of fields in the management frame and is used to implement device discovery. It can be understood that a length of the customized field is unlimited as data in the customized field may be self-defined by a device transmitting a management frame carrying the customized field. Compared with that the device information may only be transmitted by the second device through the S SID field in the related art, in an embodiment of the present disclosure, the device information of the second device may be further described by the second device through the added customized field. Exemplarily, the customized field may be noted as "Vendor Specific."

In at least one embodiment, the customized field includes at least one information element. In at least one embodiment, the length of the customized field may be adjusted by changing a number of information elements in the customized field or changing a length of the information element.

At step 202, the device information of the second device is acquired by the first device based on a customized field in a first management frame. The first management frame is a management frame transmitted by the second device among the at least one of the n management frames.

In an implementation, a first management frame broadcasted and transmitted by the second device is received by the first device. The device information of the second device is acquired by the first device according to a customized field in the first management frame. In another implementation, a first management frame that is unicast by the second device to the first device is received by the first device. The device information of the second device is acquired by the first device based on the customized field in the first management frame. In an embodiment of the present disclosure, the device information of the second device is acquired by the first device, which may be considered that the second device is discovered by the first device.

In at least one embodiment, the reason why the second device is triggered to transmit the first management frame includes that the second device is powered off and then powered on, or the second device is manually triggered. The reason for triggering the second device to transmit the first management frame is not limited in this embodiment of the present disclosure. In at least one embodiment, after the second device is triggered to transmit the first management frame, the first management frame is transmitted by the second device within a predetermined time slot. Exemplarily, the predetermined time slot is one hour. Exemplarily, within one hour when the second device is powered off and then powered on, the second device is in the device discovery state to transmit the first management frame.

It can be understood that, except the customized field as illustrated in an embodiment of the present disclosure, other fields existing in the management frame may also be available for the first device to discover the second device, e.g., the SSID field, which is not limited in this embodiment of the present disclosure.

To sum up, for the method according to this embodiment, when the device discovery is performed by the first device and the second device, the first device interacts with the second device by means of the n management frames. The customized field is carried in the at least one of the n management frames. The device discovery on the second device may be performed by the first device based on the customized field in the first management frame from the second device except the SSID field provided in the related art, which facilitates the second device to transmit more pieces of device information to the first device by means of the customized field, thereby achieving more efficient and more accurate device discovery.

In a schematic embodiment, the customized field includes the at least one information element. Hereinafter, by taking a format of a first information element as an example, a format of the information element in the customized field is illustrated exemplarily, and the first information element is any one of the at least one information element included in the customized field.

Figure 3:
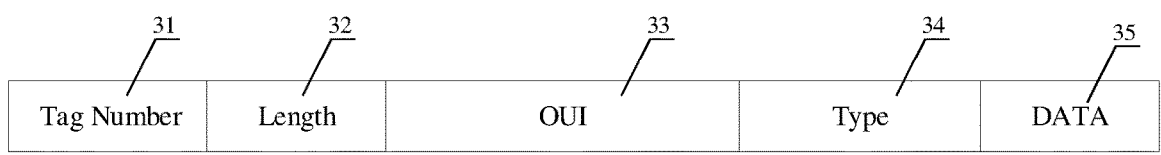
FIG. 3 is a schematic diagram of a format of a first information element according to an exemplary embodiment of the present disclosure.

FIG. 3 is a schematic diagram of a format of a first information element according to an exemplary embodiment of the present disclosure. The first information element includes at least one of: a tag number subfield 31, a length subfield 32, an organizationally unique identifier subfield 33, a data type subfield 34, and a data subfield 35.

Exemplarily, the tag number subfield 31 may be represented as Tag Number, the length subfield 32 may be represented as Length, the organizationally unique identifier subfield 33 may be represented as Organizationally Unique Identifier (OUI), the data type subfield 34 may be represented as Type, and the data subfield 35 may be represented as DATA.

1) The Tag Number Subfield 31 is Configured to Identify the Customized Field.

In an implementation, different fields may correspond to different tag numbers. The tag number subfield is used to identify that a field to which the first information element belongs is the customized field.

In at least one embodiment, a value of the tag number subfield is supported to be self-defined by a vendor to which the second device belongs. For example, the value of the tag number subfield is 221. In at least one embodiment, a length of the tag number subfield is constant. For example, the length of the tag number subfield is 1 to 4 bytes.

2) The Length Subfield 32 is Configured to Identify a Length of the First Information Element.

In at least one embodiment, a length of the length subfield is fixed. For example, the length of the length subfield is 1 to 4 bytes.

3) The OUI Subfield 33 is Configured to Identify a Format Standard Corresponding to the First Information Element.

In an implementation, different information elements may correspond to different format standards. An information element conforming to an information element format in the device discovery method as illustrated according to an embodiment of the present disclosure should have an OUI subfield 33 with a value corresponding to a fixed value. An information element under the fixed value may be considered to be an information element corresponding to a target format standard.

In at least one embodiment, a replacement implementation of step 202 includes: determining, by the first device, the format standard corresponding to the first information element based on an OUI subfield of the first information element in the first management frame; and acquiring, by the first device in response to the first information element corresponding to the target format standard, the device information of the second device from the data subfield in the first information element.

Exemplarily, the value of the OUI subfield of the information element in the target format standard is 0xFCA5D0. After the first management frame is received by the first device, a value of the OUI subfield of the first information element in the first management frame is determined by the first device. In response to the value of the OUI subfield of the first information element in the first management frame being 0xFCA5D0, the step of acquiring the device information of the second device from the data subfield in the first information element is executed by the first device. In response to the value of the OUI subfield of the first information element in the first management frame not being 0xFCA5D0, it is considered that the first information element in the first management frame does not conform to the format of the information element illustrated in FIG. 3, so that the step of acquiring the device information of the second device from the data subfield in the first information element is not executed by the first device.

In at least one embodiment, a length of the OUI subfield is fixed. For example, the length of the OUI subfield is 1 to 4 bytes.

4) The Data Type Subfield 34 is Configured to Identify a Type of Layer Two Information.

In at least one embodiment, the type of the layer two information includes at least one of: unvarnished transmission data, a device discovery request, a device discovery response, a device provisioning request, a device provisioning response, a device password synchronization request, and a device password synchronization response. Different types of layer two information may be identified by the data type subfields in different values. For example, with reference to the following Table 1:

TABLE 1

| Data type subfield | Definition |
| --- | --- |
| 0x00 | Unvarnished transmission data |
| 0x01 | Device discovery request |
| 0x02 | Device discovery response |
| 0x03 | Device provisioning request |
| 0x04 | Device provisioning response |
| 0x05 | Device password synchronization request |
| 0x06 | Device password synchronization response |

Here, the device discovery request is used to request the other device to transmit device information of the other device, to perform device discovery for the other device. The device discovery response is used to carry device information of the device to perform device discovery on the device.

Exemplarily, in an embodiment of the present disclosure, a value of a data type subfield of the first management frame transmitted by the second device to the first device may be 0x02. Layer two information carried in the first management frame is identified as the device discovery response, and the device discovery response carries the device information of the second device.

Exemplarily, in an embodiment of the present disclosure, a value of a data type subfield of a second management frame transmitted by the first device to the second device may be 0x01, layer two information carried in the second management frame is identified as the device discovery request. Device information of the first device is carried by the device discovery request.

In at least one embodiment, a length of the data type subfield is constant. For example, the length of the data type subfield is 1 to 4 bytes.

5) The Data Subfield 35 is Configured to Describe Content Information of the Layer Two Information.

In at least one embodiment, a length of the data subfield is changeable.

Exemplarily, in a case where the management frame is the first management frame transmitted by the second device, the layer two information is the device discovery response and has content information including the device information of the second device. Exemplarily, in a case where the management frame is a second management frame transmitted by the first device, the layer two information is the device discovery request and has content information including the device information of the first device.

In this embodiment of the present disclosure, the customized field includes the at least one information element. The information elements in the customized field are all in the format illustrated in FIG. 3.

In an implementation, when one information element is unable to include all data, a plurality of information elements is supported to be connected to each other to form the customized field. Information elements of the data type subfields having the same value are sequentially spliced together to serve as complete data for parsing performed by the first device. In at least one embodiment, the plurality of information elements may be spliced in order or be freely spliced together. This embodiment of the present disclosure is not limited thereto.

Figure 4:
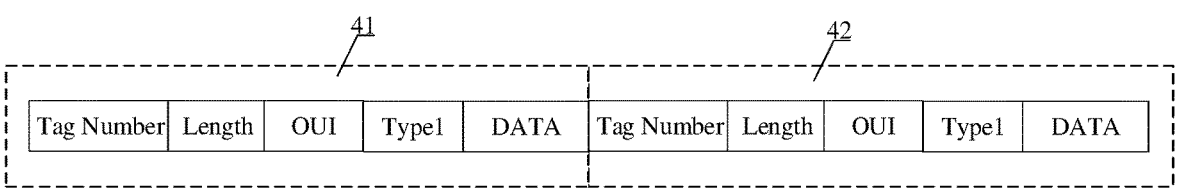
FIG. 4 is a schematic diagram of information element splicing according to an exemplary embodiment of the present disclosure.

Exemplarily, with reference to FIG. 4, a first information element 41 and a second information element 42 have the data type subfields with the same value: Type 1, the first information element 41 and the second information element 42 are spliced together by the first device for parsing.

Figure 5:
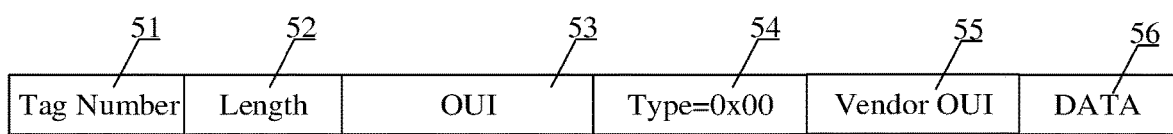
FIG. 5 is a schematic diagram of a format of a first information element according to an exemplary embodiment of the present disclosure.

In an implementation, when a value of the data type subfield is 0x00, the layer two information is the unvarnished transmission data and is used to transmit data customized by the vendor. In this case, an additional vendor OUI subfield (which may be recorded as a Vendor OUI) is added to the first information element for identifying the vendor. For the format of the first information element, reference may be made to FIG. 5. The first information element includes at least one of: a tag number subfield 51, a length subfield 52, an OUI subfield 53, a data type subfield 54, a vendor OUI subfield 55, and a data subfield 56.

To sum up, the format of the information element in the customized field is well-defined in the method according to this embodiment. The information element includes at least one of: a tag number subfield, a length subfield, an OUI subfield, a data type subfield, and a data subfield. The customized field may include the plurality of information elements. In the present disclosure, by splicing information elements, more data may be transmitted and an expression content of the customized field may be expanded.

Based on the format of the information element illustrated in FIG. 3, the first management frame transmitted by the second device has the following two cases.

Case one: The first management frame is a management frame transmitted by the second device in response to the second management frame. The second management frame is a management frame broadcasted and transmitted by the first device.

A type of the first management frame includes the action frame or the probe frame. A type of the second management frame includes the action frame or the probe frame.

Figure 6:
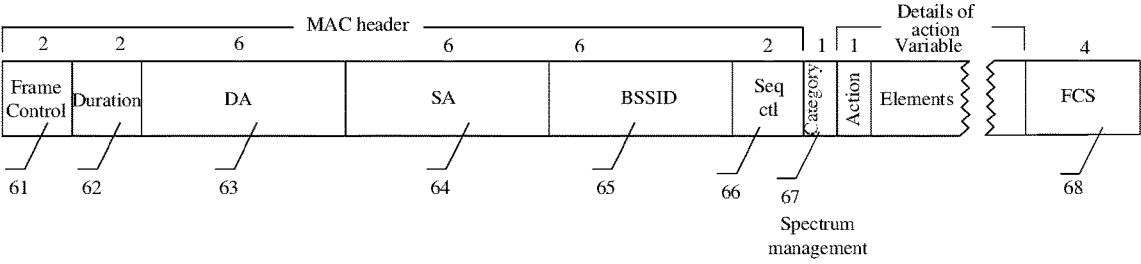
FIG. 6 is a schematic diagram of an action frame defined in a protocol.

Here, the action frame is a frame with a SubType subfield having a value of 1101 defined in the IEEE 802.11. In the IEEE 802.11, a schematic diagram of the action frame is in combination with and refers to FIG. 6. As illustrated in FIG. 6, a required field of the action frame at least includes: a Frame Control field 61, a Duration field 62, a Destination Address (DA) field 63, a Source Address (SA) field 64, a Basic Service Set Identifier (BSSID) field 65, a Sequence Control field 66, a Category field 67, and a Frame Check Sequence (FCS) field 68.

In this embodiment of the present disclosure, the action frame includes the customized field. Based on a definition in the IEEE 802.11, a format of the action frame proposed according to this embodiment of the present disclosure is illustrated in Table 2 below.

TABLE 2

| Data sequence number | Data definition | Description | Length (byte) |
|---|---|---|---|
| 1 | Frame control field | Describe information related to controlling the frame | 2 |
| 2 | Duration field | Calculate a time of duration of the frame | 2 |
| 3 | DA field | DA of the frame | 6 |
| 4 | SA field | SA of the frame | 6 |
| 5 | BSSID field | Used to filter the received frame | 6 |
| 6 | Sequence control field | Used to recombine a frame segment and discard a repeated frame | 2 |
| 7 | SSID field | Describe a network name | 2 to 34 |
| 8 | Category field | 0x04: public action | 1 |
| 9 | Action field | 0x09: defined by the vendor | 1 |
| 10 | Customized field | As illustrated in the present disclosure | n |
| 11 | FCS field | Used to verify whether the frame has an error | 4 |

As illustrated in Table 2 above, in this embodiment of the present disclosure, the action frame further includes a customized field with a digital sequence number of 10 except the required fields of the action frame as specified in the IEEE 802.11, and the length of the customized field is n bytes, where n is the positive integer.

Figure 7:
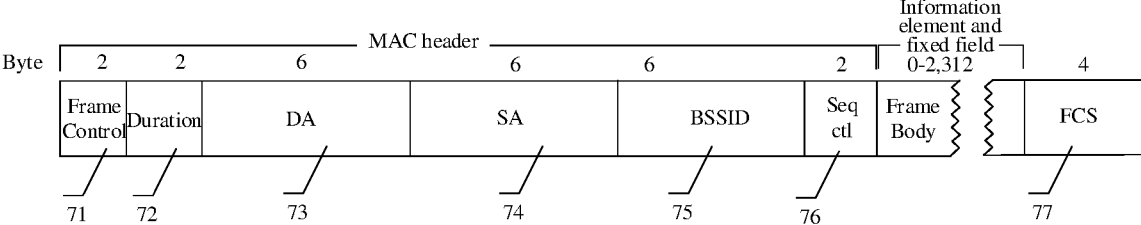
FIG. 7 is a schematic diagram of a probe frame defined in a protocol.

Here, the probe frame is a frame with a SubType subfield having a value of 0100 or 0101 defined in the IEEE 802.11. In the IEEE 802.11, FIG. 7 is a schematic diagram of the probe frame. As illustrated in FIG. 7, a required field of the probe frame at least includes: a frame control field 71, a duration field 72, a DA field 73, a SA field 74, a BSSID field 75, a sequence control field 76, and an FCS field 77.

In this embodiment of the present disclosure, the probe frame includes the customized field. Based on the definition in the IEEE 802.11, a format of the probe frame proposed according to this embodiment of the present disclosure is illustrated in Table 3 below.

TABLE 3

| Data sequence number | Data definition | Description | Length (byte) |
|---|---|---|---|
| 1 | Frame control field | Describe the information related to controlling the frame | 2 |
| 2 | Duration field | Calculate the time of duration of the frame | 2 |
| 3 | DA field | The DA of the frame | 6 |
| 4 | SA field | The SA of the frame | 6 |
| 5 | BSSID field | Used to filter a received MAC frame | 6 |
| 6 | Sequence control field | Used to recombine the frame segment and discard the repeated frame | 2 |
| 7 | SSID field | Describe the network name | 2 to 34 |
| 8 | Support rate field | Describe a supported transmission rate | 3 to 10 |
| 9 | Expanded support rate field | Describe the supported transmission rate | 3 to 257 |
| 10 | Customized field | As illustrated in the present disclosure | n |
| 11 | FCS field | Used to verify whether the frame has an error | 4 |

As illustrated in Table 3 above, in this embodiment of the present disclosure, the probe frame further includes the customized field with the digital sequence number of 10 except the required fields of the probe frame as specified in the IEEE 802.11, and the length of the customized field is n bytes, where n is the positive integer.

Case two: The first management frame is the management frame broadcasted and transmitted by the second device.

The type of the first management frame is the beacon frame.

Figure 8:
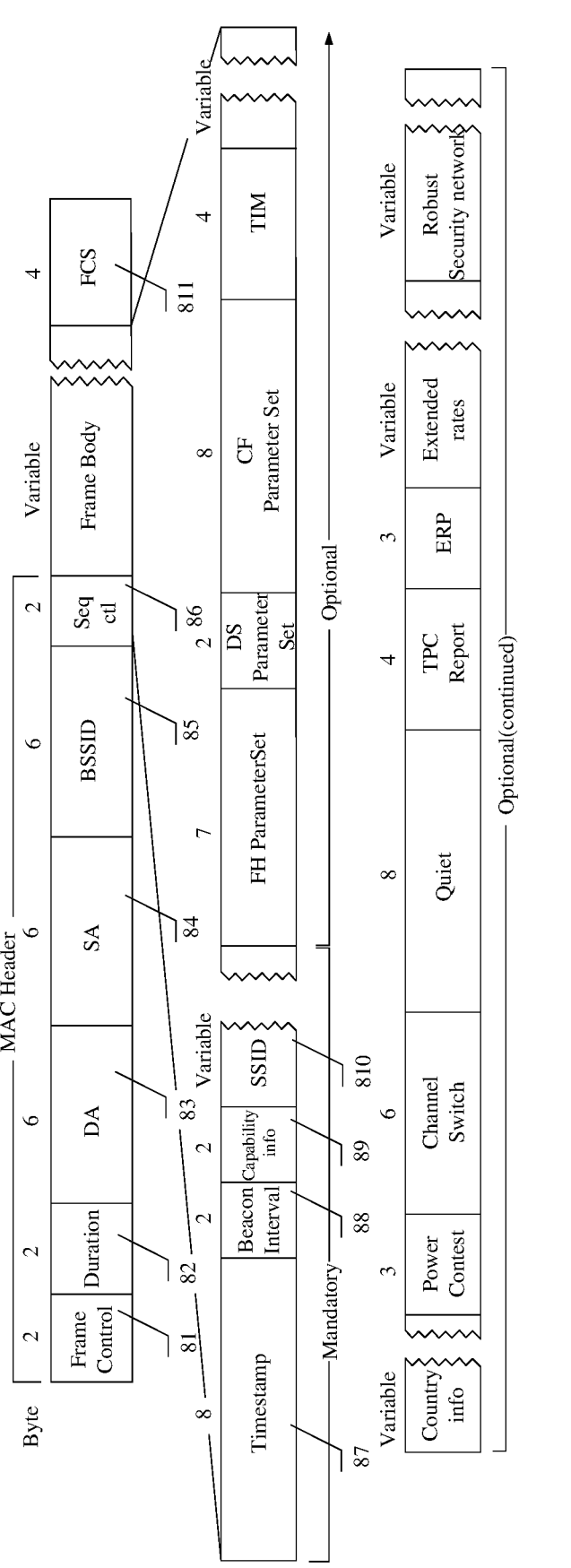
FIG. 8 is a schematic diagram of a beacon frame defined in a protocol.

Here, the beacon frame is a frame with a SubType subfield having a value of 1000 defined in the IEEE 802.11. In the IEEE 802.11, FIG. 8 is a schematic diagram of the beacon frame. As illustrated in FIG. 8, a required field of the beacon frame at least includes: a frame control field 81, a duration field 82, a DA field 83, a SA field 84, a BSSID field 85, a sequence control field 86, a Timestamp field 87, a Beacon Interval field 88, a Capability field 89, a SSID field 810, and an FCS field 811.

In this embodiment of the present disclosure, the beacon frame includes the customized field. Based on the definition in the IEEE 802.11, a format of the beacon frame proposed in this embodiment of the present disclosure is illustrated in Table 4 below.

TABLE 4

| Data sequence number | Data definition | Description | Length (byte) |
|---|---|---|---|
| 1 | Frame control field | Describe the information related to controlling the frame | 2 |
| 2 | Duration field | Calculate the time of duration of the frame | 2 |
| 3 | DA field | The DA of the frame | 6 |
| 4 | SA field | The SA of the frame | 6 |
| 5 | BSSID field | Used to filter the received frame | 6 |
| 6 | Sequence control field | Used to recombine the frame segment and discard the repeated frame | 2 |
| 7 | Timestamp field | Used for synchronization | 8 |
| 8 | Beacon interval field | Describe an interval of the beacon frame | 2 |
| 9 | Capability field | Describe network performance | 2 |
| 10 | SSID field | Describe the network name | 2 to 34 |
| 11 | Customized field | As illustrated in the present disclosure | n |
| 12 | FCS field | Used to verify whether the frame has an error | 4 |

As illustrated in Table 4 above, in this embodiment of the present disclosure, the beacon frame further includes a customized field with a digital sequence number of 11 except the required fields of the beacon frame as specified in the IEEE 802.11, and the length of the customized field is n bytes, where n is the positive integer.

For the foregoing two cases, exemplary descriptions are provided below.

Description one: The first management frame is the management frame transmitted by the second device in response to the second management frame. The second management frame is the management frame broadcasted and transmitted by the first device.

Figure 9:
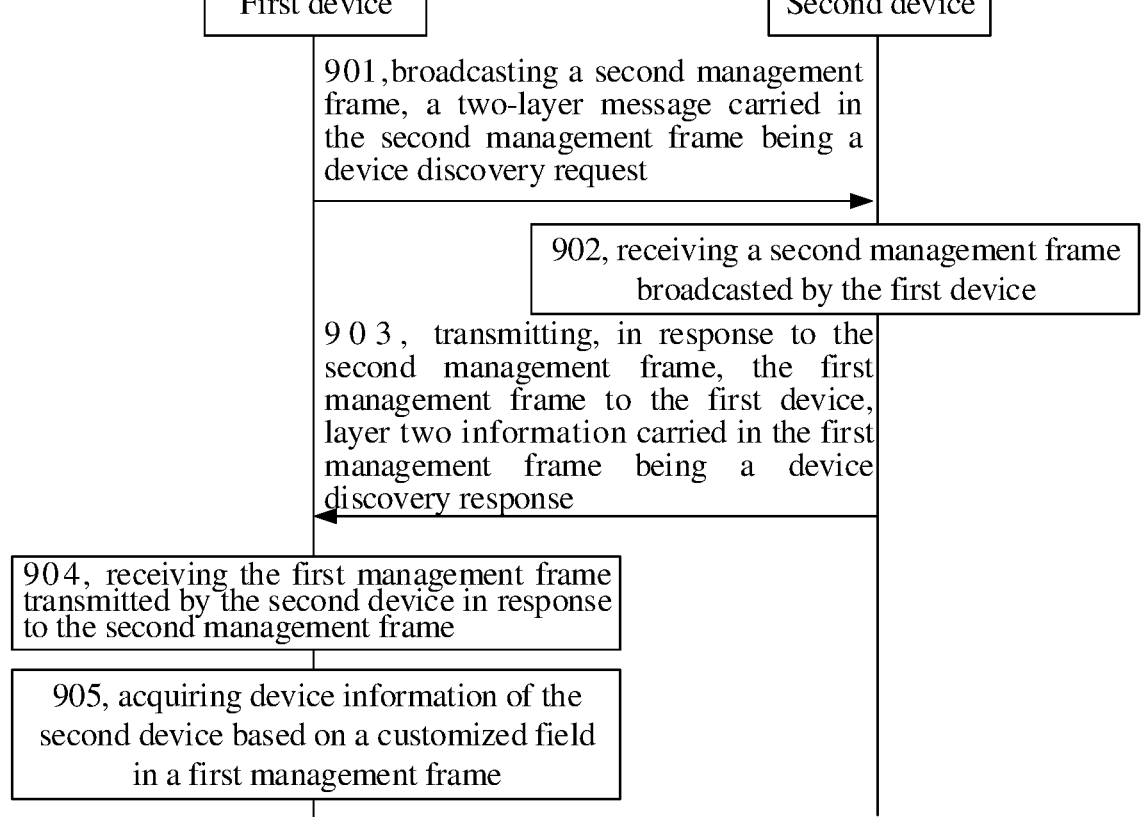
FIG. 9 is a flowchart of a device discovery method according to an exemplary embodiment of the present disclosure.

FIG. 9 is a flowchart of a device discovery method according to an exemplary embodiment of the present disclosure. As illustrated in FIG. 9, the method may be performed by the IoT system illustrated in FIG. 1 and may include the following step.

At step 901, the second management frame is broadcasted by the first device. The layer two information carried in the second management frame is the device discovery request.

The type of the second management frame includes the action frame or the probe frame.

In an implementation, the first device is triggered to enter the device discovery state. The second management frame is broadcasted and transmitted by the first device across all channel to request the device discovery.

In at least one embodiment, the first device broadcasting the second management frame belongs to a broadcast mode of connectable broadcasting. The connectable broadcasting means that other devices are allowed by the first device to respond to and establish a connection with the second management frame broadcasted by the first device.

In an embodiment of the present disclosure, the first management frame and the second management frame are in the same format, and the second management frame also carries the customized field. With reference to FIG. 3, when the customized field is carried by the second management frame, the device information of the first device is carried by the first device through the data subfield in the customized field of the second management frame.

In at least one embodiment, a value of a data type subfield corresponding to the device discovery request is a first value, and a data subfield corresponding to the device discovery request carries device information of the first device. Exemplarily, as illustrated in Table 1, a value of the data type subfield in the second management frame is 0x01, which indicates that the layer two information carried in the second management frame is the device discovery request and carries the device information of the first device.

In at least one embodiment, the device information of the first device includes: first capability information configured to describe a provisioning capability of or a password synchronization capability of the first device.

Exemplarily, an encoding reference of the data subfield in the second management frame is illustrated as follows:

two information carried in the second management frame being the device discovery request.

At step 903, the first management frame is transmitted, by the second device in response to the second management frame, to the first device. The layer two information carried in the first management frame is the device discovery response.

The type of the first management frame includes the action frame or the probe frame.

In an implementation, after the second management frame is received by the second device, in response to the second management frame, the first management frame is transmitted by the second device in the working channel of the second device.

In an embodiment of the present disclosure, the device information of the second device is carried by the data subfield in the customized field of the first management frame.

In at least one embodiment, a value of a data type subfield corresponding to a device discovery response is a second value, and a data subfield corresponding to the device discovery response carries the device information of the second device. Exemplarily, as illustrated in Table 1, the value of the data type subfield in the first management frame is 0x02, which indicates that the layer two information carried in the first management frame is the device discovery response and carries the device information of the second device.

In at least one embodiment, the device information of the second device includes at least one of: second capability information configured to describe a provisioning capability of or a Pairwise Master Key (PMK) network connection capability of the second device; state information configured to describe a provisioning state of the second device; product identification information configured to describe a model

```
message DiscoveryReq
    {        enum Capability{
            DEFAULT = 0x00;   // The default is 0, without any capability
            SETUP_DEV = 0x01;   // bit0: have a provisioning capability for the device
            SYNC_KEY = 0x02;   // bit1: have a password synchronization capability for the
device
        }
        uint32 capability = 1;   // A final value is acquired by following or calculating the above
enumeration values.
    }
```

At step 902, the second management frame broadcasted by the first device is received by the second device.

In an implementation, in a case where the second management frame is broadcasted and transmitted by the first device in the full channel, the second management frame transmitted by the first device is received by the second device in a working channel of the second device. The first device having a request of performing device discovery is determined by the second device on the basis of the layer of the second device or a vendor to which the second device belongs; vendor data information configured to describe data customized by the vendor to which the second device belongs; and a random number configured to generate a shared key to encrypt networking information in a provisioning process.

Exemplarily, an encoding reference of the data subfield in the first management frame is illustrated as follows:

```
message DiscoveryResp
        {        enum Capability {
                DEFAULT = 0x00;   // The default is 0, without any capability
                SUPPORT_L2SETUP = 0x01;   // bit0: have a two-layer provisioning capability
                SUPPORT_PMK = 0x02;   // bit1: have a wifi connection capability of the PMK
            }        enum
        Status {
                ALREADY_BIND = 0;   // a network has been configured
                NEED_BIND = 1;   // the network to be configured

}
```

-continued

```
        uint32 capability = 1;   // The final value is acquired by following or calculating the
above Capability enumeration values      string pid = 2;   // Product Identifier
        Status status = 3;
        bytes vendorData = 4;   // the data customized by the vendor
    bytes random = 5;
}
```

At step 904, the first management frame transmitted by the second device in response to the second management frame is received by the first device.

Here, the type of the first management frame includes the action frame or the probe frame.

In an implementation, the first management frame transmitted by the second device in response to the second management frame is received by the first device in the working channel of the second device. The layer two information carried in the first management frame is the device discovery response.

At step 905, the device information of the second device is acquired by the first device based on the customized field in the first management frame.

In an implementation, after the first management frame is received by the first device, the customized field of the first management frame is discovered, and the data subfield in the customized field is parsed. In this way, it is possible to understand the device information of the second device and to discover the second device.

Description two: The first management frame is the management frame broadcasted and transmitted by the second device.

discovery response carries the device information of the second device. Exemplarily, as illustrated in Table 1, the value of the data type subfield in the first management frame is 0x02, indicating that the first management frame is the device discovery response and carries the device information of the second device.

In at least one embodiment, the device information of the second device includes at least one of: second capability information configured to describe a provisioning capability of or a Pairwise Master Key (PMK) network connection capability of the second device; state information configured to describe a provisioning state of the second device; product identification information configured to describe a model of the second device or a vendor to which the second device belongs; vendor data information configured to describe data customized by the vendor to which the second device belongs; and a random number configured to generate a shared key to encrypt networking information in a provisioning process.

Exemplarily, the encoding reference of the data subfield in the first management frame is illustrated as follows:

```
message DiscoveryResp
{        enum Capability {
            DEFAULT = 0x00;   // The default is 0, without any capability
            SUPPORT_L2SETUP = 0x01;   // bit0: have the two-layer provisioning capability
            SUPPORT_PMK = 0x02;   // bit1: have the wifi connection capability of the PMK
        }      enum
    Status {
            ALREADY_BIND = 0;   // The default is 0, and the network has been configured
            NEED_BIND = 1;   // the network to be configured
        }
        uint32 capability = 1;   // The final value is acquired by following or calculating the
above Capability enumeration values      string pid = 2;   // product identifier
        Status status = 3;
        bytes vendorData = 4;   // the data customized by the vendor
    bytes random = 5;
}
```

Figure 10:
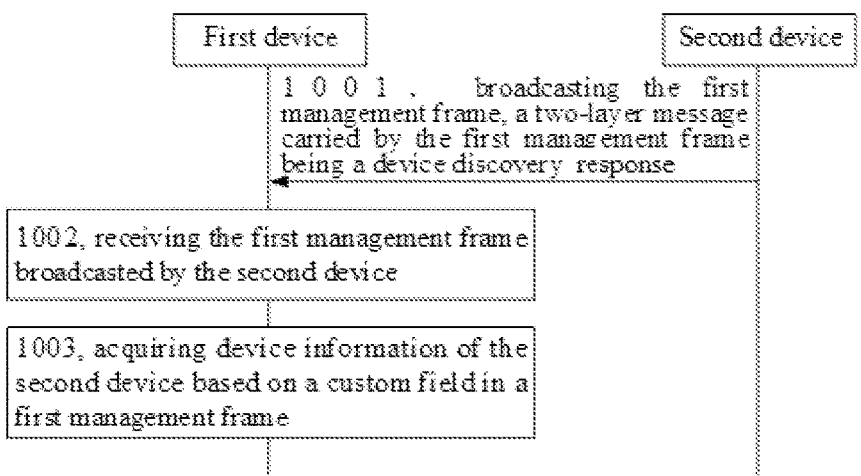
FIG. 10 is a flowchart of a device discovery method according to an exemplary embodiment of the present disclosure.

FIG. 10 is a flowchart of a device discovery method according to an exemplary embodiment of the present disclosure. As illustrated in FIG. 10, the method may be performed by the IoT system illustrated in FIG. 1 and may include the following step.

At step 1001, the first management frame is broadcasted by the second device. The layer two information carried in the first management frame is the device discovery response.

Here, the type of the first management frame is the beacon frame.

In an implementation, when the second device is in a discovered state, the first management frame is broadcasted by the second device in the working channel thereof, and the layer two information carried in the first management frame is the device discovery response.

In at least one embodiment, a value of a data type subfield corresponding to the device discovery response is a second value, and a data subfield corresponding to the device At step 1002, the first management frame broadcasted by the second device is received by the first device.

Here, a self-defined layer two information carried in the first management frame is the device discovery response.

At step 1003, the device information of the second device is acquired by the first device based on the customized field in the first management frame.

In an implementation, after the first management frame is received by the first device, the customized field in the first management frame is discovered, and the data subfield in the customized field is parsed. Therefore, it is possible to understand the device information of the second device and to discover the second device.

To sum up, in the method according to this embodiment, the first management frame transmitted by the second device may be the action frame, the probe frame, or the beacon frame, thereby enhancing flexibility of device discovery between the first device and the second device.

Meanwhile, in a case where the second device itself does not support the AP function or does not start the AP mode, there is no need to transmit the beacon frame, but to interact with the first device by means of the action frame or the probe frame. The customized field is carried in the action frame or the probe frame. Information required for performing device discovery is transmitted by the customized field. In this way, an implementation scenario of the device discovery is expanded, and effective implementation of device discovery is ensured.

In a schematic embodiment, after the second device is discovered by the first device, whether to prompt the discovered second device to the user is determined by the first device based on the distance determination logic. In practice, the second device discovered by the first device is a device around the first device. Possibly, the second device is not a device of the user corresponding to the first device. At this time, it is possible to prevent device discovery prompt information corresponding to devices belonging to other users from being incorrectly displayed on the first device based on the distance determination logic.

Figure 11:
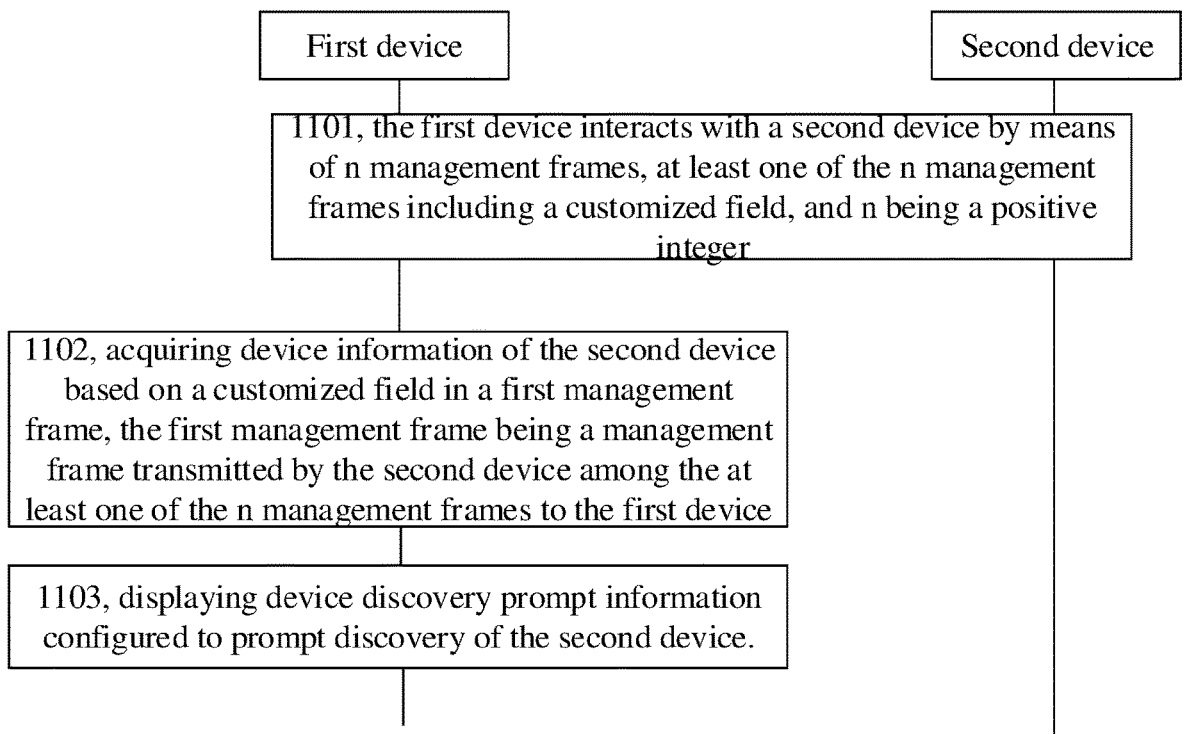
FIG. 11 is a flowchart of a device discovery method according to an exemplary embodiment of the present disclosure.

FIG. 11 is a flowchart of a device discovery method according to an embodiment of the present disclosure. As illustrated in FIG. 11, the method may be performed by the IoT system illustrated in FIG. 1 and may include the following step.

At step 1101, the first device interacts with the second device by means of the n management frames. The at least one of the n management frames includes the customized field, and n is the positive integer.

An implementation of this step may be referred to step 201, and details thereof will be omitted herein.

At step 1102, the device information of the second device is acquired by the first device based on the customized field in the first management frame. The first management frame is the management frame transmitted by the second device among the at least one of the n management frames.

An implementation of this step may be referred to step 202, and details thereof will be omitted herein.

At step 1103, the device discovery prompt information is displayed by the first device. The device discovery prompt information is configured to prompt discovery of the second device.

In an implementation, in response to a signal strength satisfying a prompt condition, the device discovery prompt information is displayed by the first device.

In at least one embodiment, the prompt condition is preset in the first device. After a signal strength of the second device is determined, whether the signal strength of the second device satisfies the prompt condition is determined by the first device. In a case where the prompt condition is satisfied, the device discovery prompt information is displayed to prompt the user to discover the second device.

In at least one embodiment, the prompt condition is that the signal strength of the second device is higher than a threshold. The stronger the signal strength, the closer the second device to the first device, the more likely the second device is a device belonging to the user. The threshold may be set by default or manually. For example, the threshold is −45 db.

In at least one embodiment, since there exist differences in the signal strength when the first management frame is transmitted by different types of second devices, different prompt conditions may be set for different types of second devices. For example, in response to the second device being the smart speaker, the prompt condition is a first prompt condition; and in response to the second device being a fan, the prompt condition is a second prompt condition.

In at least one embodiment, the user may be prompted to discover the second device by the first device through other forms such as voice broadcast device discovery prompt information except for displaying the device discovery prompt information. This embodiment of the present disclosure is not limited thereto.

It can be understood that in response to that the signal strength of the second device does not satisfy the prompt condition, device discovery prompt information corresponding to the second device is not displayed by the first device, i.e., the discovered second device is ignored.

To sum up, in the method according to this embodiment, the first device acquires the signal strength of the second device and determines whether to display the device discovery prompt information based on the signal strength of the second device, so as to prompt the user that the second device has been discovered. Moreover, in a case where the signal strength may represent a distance between the first device and the second device, the devices that are too far away from each other and may belong to other users are not prompted by the first device. Therefore, the device discovery prompt is more accurately performed to the user.

In a schematic embodiment, an application scenario is supported by the first device to be detected. In this way, whether a user carrying the first device is in the home-returning scenario is determined, and device discovery at the first device is triggered only in the home-returning scenario. Since the first device carried by the user generally has only permission to control an at-home second device, the first device has no need for device discovery performed in other scenarios. Frequent and invalid device discovery processes may be avoided by determining the application scenario.

Figure 12:
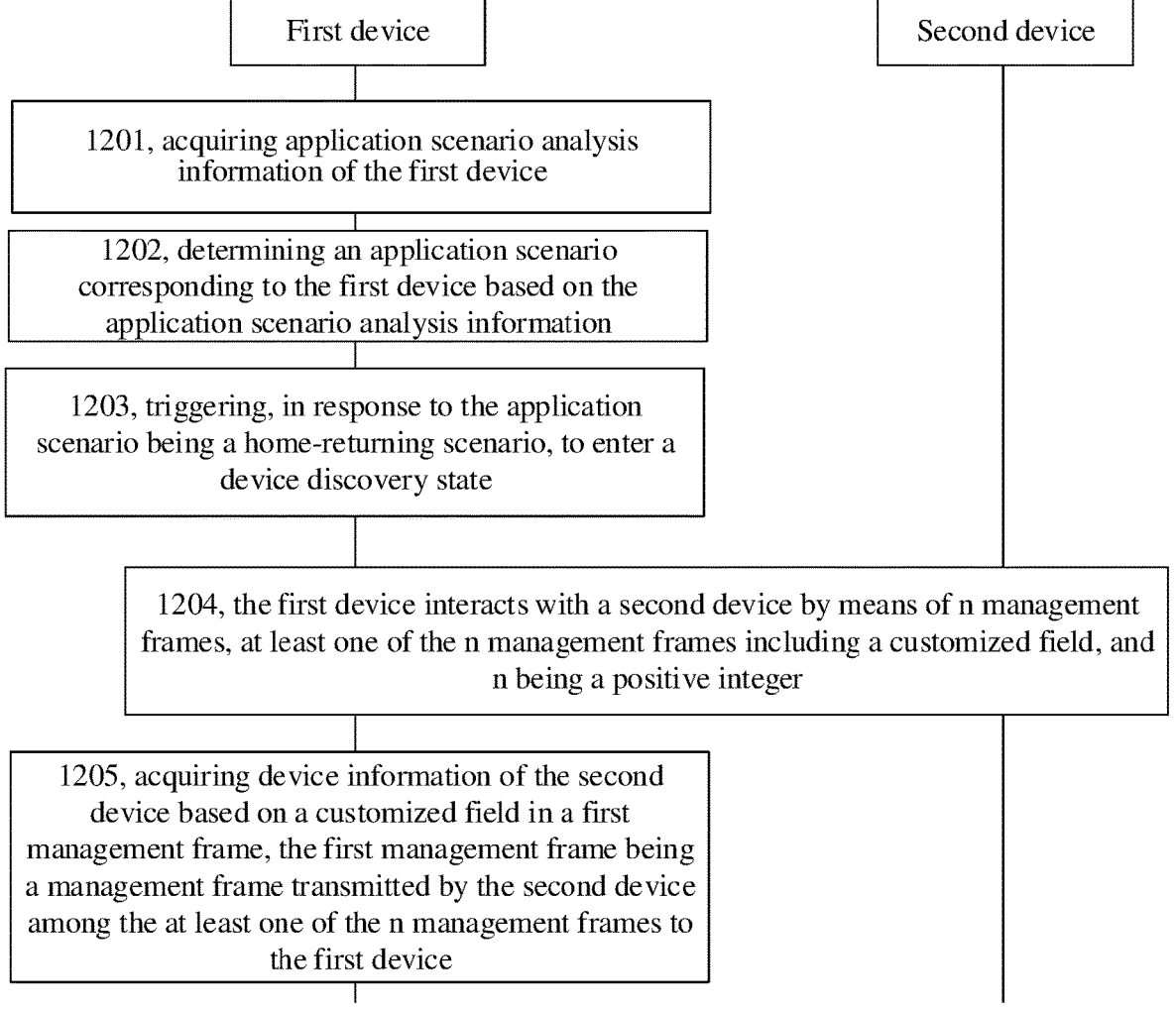
FIG. 12 is a flowchart of a device discovery method according to an exemplary embodiment of the present disclosure.

FIG. 12 is a flowchart of a device discovery method according to an embodiment of the present disclosure. As illustrated in FIG. 12, the method may be performed by the IoT system illustrated in FIG. 1 and may include the following step.

At step 1201, application scenario analysis information of the first device is acquired by the first device.

The application scenario analysis information is reference information for analyzing the application scenario and includes at least one of geographical location information of the first device and hotspot scanning information of the first device.

The application scenario is used to describe a running scenario of the first device. In at least one embodiment, in different application scenarios, different functional states are triggered by the first device. In this embodiment of the present disclosure, the application scenario includes the home-returning scenario that triggers the first device to enter the device discovery state.

The home-returning scenario refers to a scenario in which the first device reaches a predetermined geographic location area. In this embodiment of the present disclosure, as an example, only the predetermined geographic location area is the home of the user to which the first device belongs for description. The predetermined geographic location area may also be other areas, such as a company of and a school of the user to which the first device belongs.

At step 1202, an application scenario corresponding to the first device is determined by the first device based on the application scenario analysis information.

In an implementation, the operation of step 1202 includes: determining, by the first device, the application scenario based on the geographical location information.

In at least one embodiment, the geographic location information of the first device is acquired by the first device at a predetermined time interval or in real time. A current geographic location of the first device is determined by the first device based on the geographic location information. The current geographic location of the first device is compared by the first device with the predetermined geographic location area. Thus, it is possible to determine the application scenario corresponding to the first device.

In another implementation, the operation of step 1202 includes: determining, by the first device, the application scenario based on the hotspot scanning information.

Since a predetermined geographic location area generally corresponds to one or more fixed scannable hotspots, these fixed scannable hotspots are determined as predetermined hotspots, and the first device supports determining the geographic location of the first device indirectly by acquiring the hotspot scanning information, thereby determining the application scenario corresponding to the first device.

In at least one embodiment, the hotspot scanning information of the first device is acquired by the first device at a predetermined time interval or in real time. A hotspot in the hotspot scanning information is compared by the first device with the predetermined hotspot, thus determining the application scenario corresponding to the first device.

At step 1203, the first device is triggered to enter the device discovery state in response to the application scenario being the home-returning scenario.

The device discovery state refers to a state in which the device discovery is supported by the first device to be performed. In an implementation, in a case where it is detected that the current application scenario is the home-returning scenario, the first device is triggered to enter the device discovery state, to subsequently perform device discovery on the second device.

At step 1204, the first device interacts with the second device by means of the n management frames. The at least one of the n management frames includes the customized field, and n is the positive integer.

An implementation of this step may be referred to step 201, and details thereof will be omitted herein.

At step 1205, the device information of the second device is acquired by the first device based on the customized field in the first management frame. The first management frame is the management frame transmitted by the second device among the at least one of the n management frames.

An implementation of this step may be referred to step 202, and details thereof will be omitted herein.

To sum up, in the method according to this embodiment, the first device is triggered, by determining the application scenario corresponding to the first device, to enter the device discovery state only in response to the application scenario being the home-returning scenario, thereby reducing the disturbance to the user and saving the electric quantity of the first device.

In a schematic embodiment, after the device information of the second device is acquired by the first device, the first device further executes the following step.

The device information of the second device is reported by the first device to a software development kit (SDK) corresponding to the second device.

In an implementation, in the first device, there is provided a plurality of SDKs. Vendors to which different types of second devices belong correspond to different SDKs. After the device information of the second device is acquired by the first device, the SDK corresponding to the second device is determined by the first device according to the device information of the second device, like a Product Identifier (PID) of the second device. Moreover, the device information of the second device is reported by the first device to the SDK corresponding to the second device. In at least one embodiment, subsequent provisioning processes are executed by the SDK corresponding to the second device through the device information of the second device.

Hereinafter, an exemplary description for the device discovery method illustrated in the present disclosure is provided in combination with the following embodiments. In this embodiment, an exemplary description is provided by using the first device as a mobile phone and using the second device as the smart speaker. In this embodiment, device discovery on the smart speaker is realize by the mobile phone through the installed IoT Application (APP).

Figure 13:
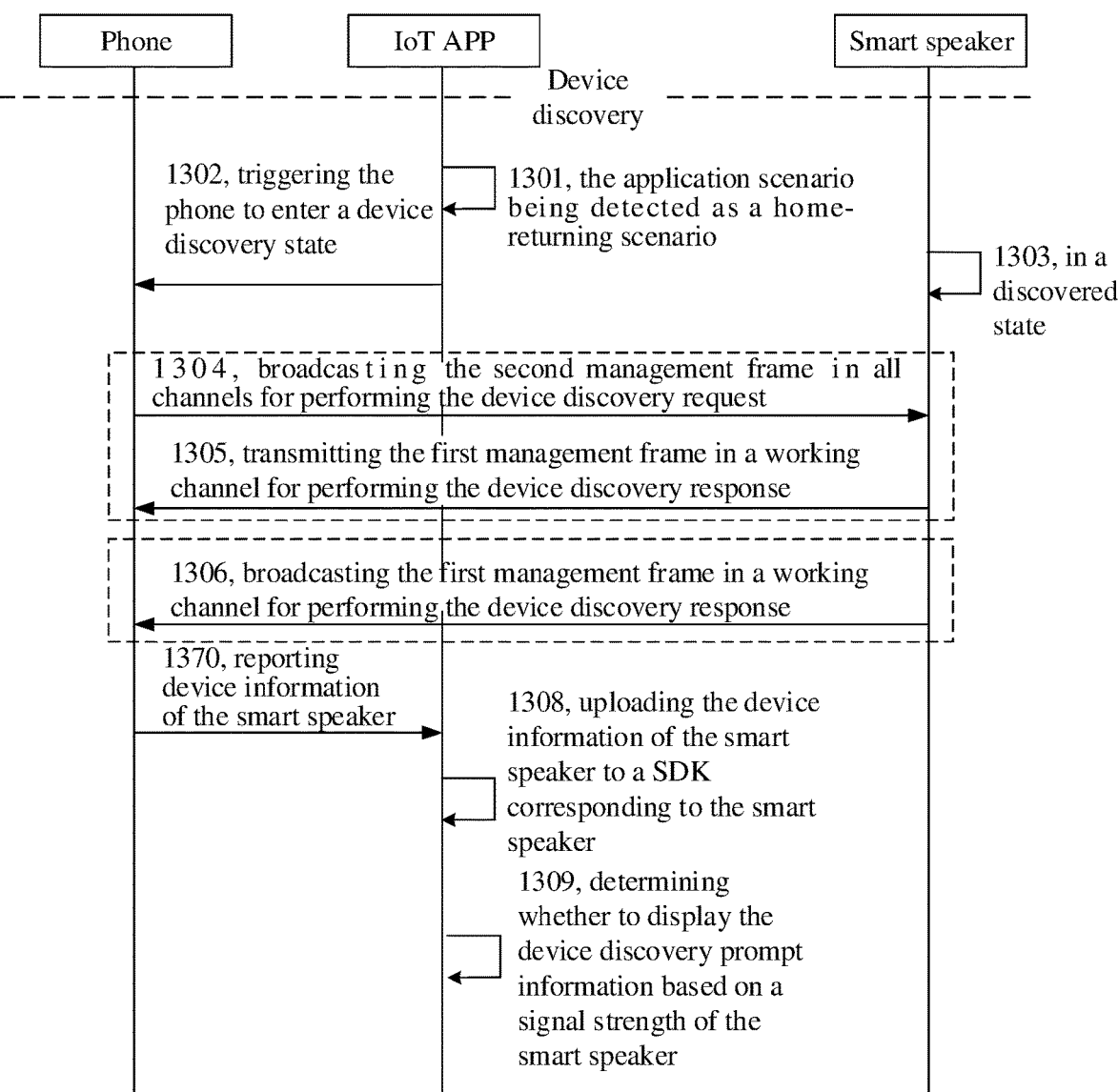
FIG. 13 is a flowchart of a device discovery method according to an exemplary embodiment of the present disclosure.

FIG. 13 is a flowchart of a device discovery method according to an embodiment of the present disclosure. As illustrated in FIG. 13, the method may be performed by the IoT system illustrated in FIG. 1 and may include the following step.

At step 1301, the application scenario is detected by the IoT APP as the home-returning scenario.

That is, a user holding the mobile phone is detected by the IoT APP to be home.

At step 1302, the mobile phone is triggered by the IoT APP to enter the device discovery state.

At step 1303, the smart speaker is in the discovered state.

In at least one embodiment, in a case where the smart speaker is powered off and then powered on, the smart speaker is triggered to enter the discovered state. That is, a smart device is in a state that supports other devices to discover itself.

In this embodiment, step 1304 and step 1305 continue to be performed between the mobile phone and the smart speaker; or step 1306 continues to be executed between the mobile phone and the smart speaker.

At step 1304, the second management frame is broadcasted by the mobile phone broadcasts in all channels for performing the device discovery request.

Here, the type of the second management frame includes the probe frame or the action frame.

In at least one embodiment, the customized field is carried in the second management frame and has the format of the information element as illustrated in FIG. 3. Exemplarily, as illustrated in Table 1, the value of the data type subfield in the second management frame is 0x01, which indicates that the layer two information carried in the second management frame is the device discovery request.

At step 1305, the first management frame is transmitted by the smart speaker in a working channel for performing the device discovery response.

Here, the type of the first management frame includes the probe frame or the action frame.

In at least one embodiment, the customized field is carried in the first management frame and has the format of the information element as illustrated in FIG. 3. Exemplarily, as illustrated in Table 1, the value of the data type subfield in the first management frame is 0x02, which indicates that the layer two information carried in the first management frame is the device discovery response.

At step 1306, the first management frame is broadcasted by the smart speaker in the working channel for performing the device discovery response.

Here, the type of the first management frame includes the beacon frame.

In at least one embodiment, the customized field is carried in the first management frame and has the format of the information element as illustrated in FIG. 3. Exemplarily, as illustrated in Table 1, the value of the data type subfield in the first management frame is 0x02, which indicates that the layer two information carried in the first management frame is the device discovery response.

At step 1307, device information of the smart speaker is reported by the mobile phone.

In at least one embodiment, the device information of the smart speaker is acquired by the mobile phone from the first management frame. In at least one embodiment, the device information exists in the customized field of the first management frame and other fields such as the SSID field.

At step 1308, the device information of the smart speaker is uploaded by the IoT APP to an SDK corresponding to the smart speaker.

In at least one embodiment, the SDK corresponding to the smart speaker is determined by the IoT APP according to a PID in the device information of the smart speaker. The device information of the smart speaker is uploaded by the IoT APP to the SDK corresponding to the smart speaker.

At step 1309, whether to display the device discovery prompt information is determined by the IoT APP based on a signal strength of the smart speaker.

Exemplarily, when the signal strength of the smart speaker is higher than a threshold, the device discovery prompt information is displayed by the IoT app based on the device information of the speaker device to prompt the user to discover the smart speaker.

It can be understood that the foregoing method embodiments may be implemented separately or in group, which is not limited in the present disclosure.

The apparatus embodiments of the present disclosure will be described below, which can be used to execute the method embodiments of the present disclosure. For details not disclosed in the apparatus embodiments of the present disclosure, reference can be made to the method embodiments of the present disclosure.

Figure 14:
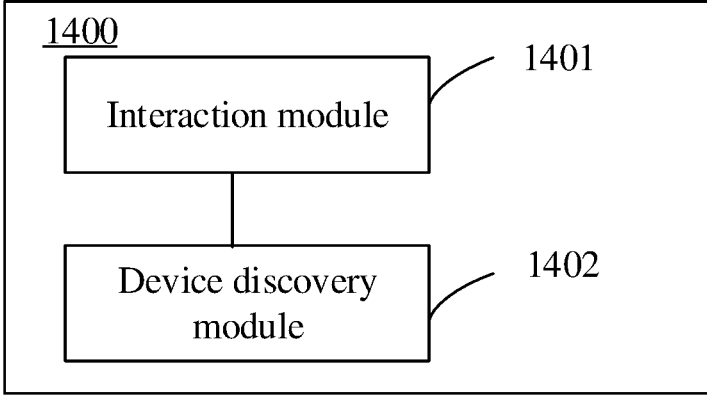
FIG. 14 is a block diagram of a device discovery apparatus according to an exemplary embodiment of the present disclosure.

Referring to FIG. 14, which shows a block diagram of a device discovery apparatus according to an embodiment of the present disclosure. The apparatus has the function of implementing the above method examples. The function may be implemented by hardware, or by executing corresponding software by hardware. The apparatus may be implemented as the first device or implemented as a part of the first device. The apparatus 1400 may include: an interaction module 1401 and a device discovery module 1402.

The interaction module 1401 is configured to interact with a second device by means of n management frames. At least one of the n management frames includes a customized field, and n is a positive integer.

The device discovery module 1402 is configured to acquire device information of the second device based on a customized field in a first management frame. The first management frame is a management frame transmitted by the second device among the at least one of the n management frames.

In a schematic embodiment, the customized field includes at least one information element, and a first information element in the at least one information element includes at least one of: a tag number subfield configured to identify the customized field; a length subfield configured to identify a length of the first information element; an organizationally unique identifier subfield configured to identify a format standard corresponding to the first information element; a data subfield configured to describe content information of layer two information; and a data type subfield configured to identify a type of the layer two information.

In a schematic embodiment, the interaction module 1401 is configured to broadcast a second management frame, layer two information carried in the second management frame being a device discovery request, and a type of the second management frame including: an action frame or a probe frame; and receive the first management frame transmitted by the second device in response to the second management frame. Layer two information carried in the first management frame is a device discovery response, and a type of the first management frame includes: the action frame or the probe frame.

In a schematic embodiment, the interaction module 1401 is configured to broadcast the second management frame across all channel; and receive, in a working channel of the second device, the first management frame transmitted by the second device in response to the second management frame.

In a schematic embodiment, a value of a data type subfield corresponding to the device discovery request is a first value, and a data subfield corresponding to the device discovery request carries device information of the first device; and a value of a data type subfield corresponding to the device discovery response is a second value, and a data subfield corresponding to the device discovery response carries the device information of the second device.

In a schematic embodiment, the interaction module 1401 is configured to receive the first management frame broadcasted by the second device. Layer two information carried in the first management frame is a device discovery response, and a type of the first management frame is a beacon frame.

In a schematic embodiment, the interaction module 1401 is configured to receive, in a working channel of the second device, the first management frame broadcasted by the second device.

In a schematic embodiment, a value of a data type subfield corresponding to the device discovery response is a second value, and a data subfield corresponding to the device discovery response carries the device information of the second device.

In a schematic embodiment, the device information of the first device includes: first capability information configured to describe a provisioning capability of or a password synchronization capability of the first device.

In a schematic embodiment, the device information of the second device includes at least one of: second capability information configured to describe a provisioning capability of or a Pairwise Master Key (PMK) network connection capability of the second device; state information configured to describe a provisioning state of the second device; product identification information configured to describe a model of the second device or a vendor to which the second device belongs; vendor data information configured to describe data customized by the vendor to which the second device belongs; and a random number configured to generate a shared key to encrypt networking information in a provisioning process.

In a schematic embodiment, the device discovery module 1402 is configured to determine the format standard corresponding to the first information element based on the organizationally unique identifier subfield in the first information element in the first management frame; and acquire, in response to the first information element corresponding to a target format standard, the device information of the second device from the data subfield in the first information element.

In a schematic embodiment, the apparatus further includes a prompt information display module. The prompt information display module is configured to display device discovery prompt information configured to prompt discovery of the second device.

In a schematic embodiment, the prompt information display module is configured to acquire a signal strength of the second device; and display, in response to the signal strength satisfying a prompt condition, the device discovery prompt information.

In a schematic embodiment, the apparatus further includes a device information reporting module. The device information reporting module is configured to report the device information of the second device to a software development kit (SDK) corresponding to the second device.

In a schematic embodiment, the apparatus further includes a scenario detection module. The scenario detection module is configured to acquire application scenario analysis information of the first device, the application scenario analysis information including at least one of geographical location information of the first device and hotspot scanning information of the first device; determine an application scenario corresponding to the first device based on the application scenario analysis information; and trigger, in response to the application scenario being a home-returning scenario, to enter a device discovery state.

Figure 15:
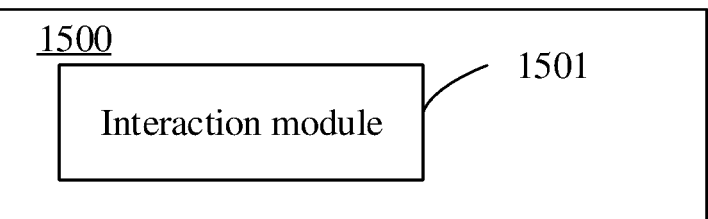
FIG. 15 is a block diagram of a device discovery apparatus according to an exemplary embodiment of the present disclosure.

Referring to FIG. 15, which shows is a block diagram of a device discovery apparatus according to an embodiment of the present disclosure. The apparatus has the function of implementing the above exemplary method. The function may be implemented by hardware, or by executing corresponding software by hardware. The apparatus may be implemented as the second device or implemented as a part of the second device. The apparatus 1500 may include an interaction module 1501 configured to interact with a first device by means of n management frames. At least one of the n management frames includes a customized field, and n is a positive integer. The at least one of the n management frames includes: a first management frame transmitted by the second device, and a customized field in the first management frame is configured to carry device information of the second device. The first management frame is a management frame transmitted by the second device.

In a schematic embodiment, the customized field includes at least one information element, and a first information element in the at least one information element includes at least one of: a tag number subfield configured to identify the customized field; a length subfield configured to identify a length of the first information element; an organizationally unique identifier subfield configured to identify a format standard corresponding to the first information element; a data subfield configured to describe content information of layer two information; and a data type subfield configured to identify a type of the layer two information.

In a schematic embodiment, the interaction module 1501 is configured to receive a second management frame broadcasted by the first device, layer two information carried in the second management frame being a device discovery request, and a type of the second management frame including: an action frame or a probe frame; and transmit, in response to the second management frame, the first management frame to the first device. Layer two information carried in the first management frame is a device discovery response, and a type of the first management frame includes: the action frame or the probe frame.

In a schematic embodiment, the interaction module 1501 is configured to receive, in a working channel of the second device, the second management frame broadcasted by the first device; and transmit, in response to the second management frame, the first management frame to the first device in the working channel of the second device.

In a schematic embodiment, a value of a data type subfield corresponding to the device discovery request is a first value, and a data subfield corresponding to the device discovery request carries device information of the first device; and a value of a data type subfield corresponding to the device discovery response is a second value, and a data subfield corresponding to the device discovery response carries the device information of the second device.

In a schematic embodiment, the interaction module 1501 is configured to broadcast the first management frame. Layer two information carried in the first management frame is a device discovery response, and a type of the first management frame is a beacon frame.

In a schematic embodiment, the interaction module 1501 is configured to broadcast, in a working channel of the second device, the first management frame.

In a schematic embodiment, a value of a data type subfield corresponding to a device discovery response is a second value, and a data subfield corresponding to the device discovery response carries the device information of the second device.

In a schematic embodiment, the device information of the first device includes: first capability information configured to describe a provisioning capability of or a password synchronization capability of the first device.

In a schematic embodiment, the device information of the second device includes at least one of: second capability information configured to describe a provisioning capability of or a Pairwise Master Key (PMK) network connection capability of the second device; state information configured to describe a provisioning state of the second device; product identification information configured to describe a model of the second device or a vendor to which the second device belongs; vendor data information configured to describe data customized by the vendor to which the second device belongs; and a random number configured to generate a shared key to encrypt networking information in a provisioning process.

It is to be noted that, when the apparatuses according to the above embodiments implement their respective functions, the division of the above functional modules is used as an example for illustration only. In actual applications, the above functions can be allocated to different functional modules according to actual needs. That is, the content structure of each apparatus may be divided into different functional modules to complete all or part of the functions described above. In addition, the apparatus according to the above embodiments belongs to a same concept as the method embodiments, and thus the detailed description of the specific implementation of the apparatus may refer to that of the method embodiment, and details thereof will be omitted herein.

Figure 16:
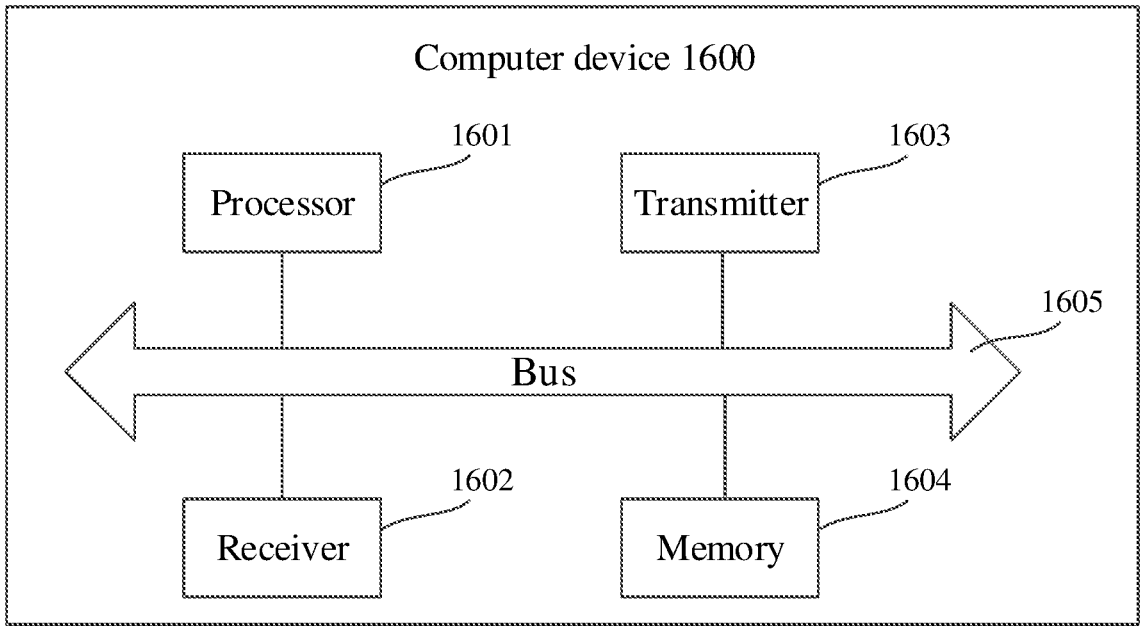
FIG. 16 is a schematic structural diagram of a computer device according to an exemplary embodiment of the present disclosure.

FIG. 16 is a schematic structural diagram of a computer device 1600 according to an embodiment of the present disclosure. The computer device 1600 can include: a processor 1601, a receiver 1602, a transmitter 1603, a memory 1604, and a bus 1605.

The processor 1601 includes one or more processing cores and is configured to perform various functional applications and information processing by executing software programs and modules.

The receiver 1602 and the transmitter 1603 may be implemented as a communication component, which may be a communication chip.

The memory 1604 is connected to the processor 1601 via the bus 1605.

The memory 1604 may be configured to store a computer program. The processor 1601 is configured to execute the computer program, so as to implement each step performed by the computer device in the above method embodiments.

In addition, the memory 1604 may be implemented by any type of volatile or non-volatile storage device or any combination thereof. The volatile or non-volatile storage devices include but are not limited to: magnetic disk or optical disc, Electrically Erasable Programmable Read-Only Memory (EEPROM), Erasable Programmable Read-Only Memory (EPROM), Static Random-Access Memory (SRAM), Read-Only Memory (ROM), magnetic memory, flash memory, Programmable Read-Only Memory (PROM), etc.

In an exemplary embodiment, the computer device includes a processor, a memory, and a transceiver (in which the transceiver may include a receiver and a transmitter, the receiver is used for receiving information and the transmitter is used for transmitting the information).

In an implementation, when the computer device is implemented as a first device, the transceiver is configured to interact with a second device by means of n management frames, at least one of the n management frames including a customized field, and n being a positive integer; and the processor is configured to acquire device information of the second device based on a customized field in a first management frame. The first management frame is a management frame transmitted by the second device among the at least one of the n management frames.

In a schematic embodiment, the customized field includes at least one information element, and a first information element in the at least one information element includes at least one of: a tag number subfield configured to identify the customized field; a length subfield configured to identify a length of the first information element; an organizationally unique identifier subfield configured to identify a format standard corresponding to the first information element; a data subfield configured to describe content information of layer two information; and a data type subfield configured to identify a type of the layer two information.

In a schematic embodiment, the transceiver is configured to broadcast a second management frame, layer two information carried in the second management frame being a device discovery request, and a type of the second management frame including: an action frame or a probe frame; and receive the first management frame transmitted by the second device in response to the second management frame. Layer two information carried in the first management frame is a device discovery response, and a type of the first management frame includes: the action frame or the probe frame.

In a schematic embodiment, the transceiver is configured to broadcast the second management frame across all channel; and receive, in a working channel of the second device, the first management frame transmitted by the second device in response to the second management frame.

In a schematic embodiment, a value of a data type subfield corresponding to the device discovery request is a first value, and a data subfield corresponding to the device discovery request carries device information of the first device; and a value of a data type subfield corresponding to the device discovery response is a second value, and a data subfield corresponding to the device discovery response carries the device information of the second device.

In a schematic embodiment, the transceiver is configured to receive the first management frame broadcasted by the second device. Layer two information carried in the first management frame is a device discovery response, and a type of the first management frame is a beacon frame.

In a schematic embodiment, the transceiver is configured to receive, in a working channel of the second device, the first management frame broadcasted by the second device.

In a schematic embodiment, a value of a data type subfield corresponding to the device discovery response is a second value, and a data subfield corresponding to the device discovery response carries the device information of the second device.

In a schematic embodiment, the device information of the first device includes: first capability information configured to describe a provisioning capability of or a password synchronization capability of the first device.

In a schematic embodiment, the device information of the second device includes at least one of: second capability information configured to describe a provisioning capability of or a Pairwise Master Key (PMK) network connection capability of the second device; state information configured to describe a provisioning state of the second device; product identification information configured to describe a model of the second device or a vendor to which the second device belongs; vendor data information configured to describe data customized by the vendor to which the second device belongs; and a random number configured to generate a shared key to encrypt networking information in a provisioning process.

In a schematic embodiment, the processor is configured to determine the format standard corresponding to the first information element based on the organizationally unique identifier subfield in the first information element in the first management frame; and acquire, in response to the first information element corresponding to a target format standard, the device information of the second device from the data subfield in the first information element.

In a schematic embodiment, the processor is configured to display device discovery prompt information configured to prompt discovery of the second device.

In a schematic embodiment, the processor is configured to acquire a signal strength of the second device; and display, in response to the signal strength satisfying a prompt condition, the device discovery prompt information.

In a schematic embodiment, the processor is configured to report the device information of the second device to a software development kit (SDK) corresponding to the second device.

In a schematic embodiment, the processor is configured to acquire application scenario analysis information of the first device, the application scenario analysis information including at least one of geographical location information of the first device and hotspot scanning information of the first device; determine an application scenario corresponding to the first device based on the application scenario analysis information; and trigger, in response to the application scenario being a home-returning scenario, to enter a device discovery state.

In an implementation, when the computer device is implemented as a second device, the transceiver is configured to interact with a first device by means of n management frames. At least one of the n management frames includes a customized field, and n is a positive integer. The at least one of the n management frames includes: a first management frame transmitted by the second device, and a customized field in the first management frame is configured to carry device information of the second device.

In a schematic embodiment, the customized field includes at least one information element, and a first information element in the at least one information element includes at least one of: a tag number subfield configured to identify the customized field; a length subfield configured to identify a length of the first information element; an organizationally unique identifier subfield configured to identify a format standard corresponding to the first information element; a data subfield configured to describe content information of layer two information; and a data type subfield configured to identify a type of the layer two information.

In a schematic embodiment, the transceiver is configured to receive a second management frame broadcasted by the first device, layer two information carried in the second management frame being a device discovery request, and a type of the second management frame including: an action frame or a probe frame; and transmit, in response to the second management frame, the first management frame to the first device. Layer two information carried in the first management frame is a device discovery response, and a type of the first management frame includes: the action frame or the probe frame.

In a schematic embodiment, the transceiver is configured to receive, in a working channel of the second device, the second management frame broadcasted by the first device; and transmit, in response to the second management frame, the first management frame to the first device in the working channel of the second device.

In a schematic embodiment, a value of a data type subfield corresponding to the device discovery request is a first value, and a data subfield corresponding to the device discovery request carries device information of the first device; and a value of a data type subfield corresponding to the device discovery response is a second value, and a data subfield corresponding to the device discovery response carries the device information of the second device.

In a schematic embodiment, the transceiver is configured to broadcast the first management frame. Layer two information carried in the first management frame is a device discovery response, and a type of the first management frame is a beacon frame.

In a schematic embodiment, the transceiver is configured to broadcast, in a working channel of the second device, the first management frame.

In a schematic embodiment, a value of a data type subfield corresponding to a device discovery response is a second value, and a data subfield corresponding to the device discovery response carries the device information of the second device.

In a schematic embodiment, the device information of the first device includes: first capability information configured to describe a provisioning capability of or a password synchronization capability of the first device.

In a schematic embodiment, the device information of the second device includes at least one of: second capability information configured to describe a provisioning capability of or a Pairwise Master Key (PMK) network connection capability of the second device; state information configured to describe a provisioning state of the second device; product identification information configured to describe a model of the second device or a vendor to which the second device belongs; vendor data information configured to describe data customized by the vendor to which the second device belongs; and a random number configured to generate a shared key to encrypt networking information in a provisioning process.

In an exemplary embodiment, further provided is a computer-readable storage medium storing a computer program therein. The computer program, when loaded and executed by a processor, implements each step in the above device discovery method embodiments.

In an exemplary embodiment, provided is a computer program product including computer instructions stored in a computer-readable storage medium. The computer instructions, when read and executed by a processor from the computer-readable storage medium, implement the device discovery method according to the above aspects.

In an exemplary embodiment, further provided is a chip including a programmable logic circuit and/or program instructions. The chip, when running, is configured to implement the device discovery method as described above.

The above described are only exemplary embodiments of the present disclosure and are not intended to limit the present disclosure. Any modifications, equivalents, improvements, etc., that are made without departing from the spirit and principle of the present disclosure should be encompassed by the scope of the present disclosure.

What is claimed is:

1. A device discovery method, performed by a first device, the method comprising:
   interacting with a second device by means of n management frames, at least one of the n management frames comprising a customized field, and n being a positive integer; and
   acquiring device information of the second device based on the customized field in a first management frame, the first management frame being a management frame transmitted by the second device among the at least one of the n management frames;
   wherein the customized field comprises at least one information element, and a first information element in the at least one information element comprises:
      a tag number subfield configured to identify the customized field;
      a data subfield configured to describe content information of layer two information; and
      a data type subfield configured to identify a type of the layer two information.

2. The method according to claim 1, wherein the first information element in the at least one information element further comprises at least one of:
   a length subfield configured to identify a length of the first information element; and
   an organizationally unique identifier subfield configured to identify a format standard corresponding to the first information element.

3. The method according to claim 2, wherein the interacting with the second device by means of the n management frames comprises:
   broadcasting a second management frame, layer two information carried in the second management frame being a device discovery request, and a type of the second management frame comprising: an action frame or a probe frame; and
   receiving the first management frame transmitted by the second device in response to the second management frame, layer two information carried in the first management frame being a device discovery response, and a type of the first management frame comprising: the action frame or the probe frame.

4. The method according to claim 3, wherein, a value of a data type subfield corresponding to the device discovery request is a first value, and a data subfield corresponding to the device discovery request carries device information of the first device; and a value of a data type subfield corresponding to the device discovery response is a second value, and a data subfield corresponding to the device discovery response carries the device information of the second device.

5. The method according to claim 4, wherein the device information of the first device comprises:

first capability information configured to describe a provisioning capability of or a password synchronization capability of the first device.

6. The method according to claim 4, wherein the device information of the second device comprises at least one of:

second capability information configured to describe a provisioning capability of or a Pairwise Master Key (PMK) network connection capability of the second device;

state information configured to describe a provisioning state of the second device;

product identification information configured to describe a model of the second device or a vendor to which the second device belongs;

vendor data information configured to describe data customized by the vendor to which the second device belongs; and a random number configured to generate a shared key to encrypt networking information in a provisioning process.

7. The method according to claim 2, wherein the interacting with the second device by means of the n management frames comprises:

receiving the first management frame broadcasted by the second device, layer two information carried in the first management frame being a device discovery response, and a type of the first management frame being a beacon frame.

8. The method according to claim 7, wherein a value of a data type subfield corresponding to the device discovery response is a second value, and a data subfield corresponding to the device discovery response carries the device information of the second device.

9. The method according to claim 1, further comprising:

displaying device discovery prompt information configured to prompt discovery of the second device, wherein the displaying device discovery prompt information comprises:

acquiring a signal strength of the second device; and displaying, in response to the signal strength satisfying a prompt condition, the device discovery prompt information.

10. The method according to claim 1, further comprising:

acquiring application scenario analysis information of the first device, the application scenario analysis information comprising at least one of geographical location information of the first device and hotspot scanning information of the first device;

determining an application scenario corresponding to the first device based on the application scenario analysis information; and triggering, in response to the application scenario being a home-returning scenario, to enter a device discovery state.

11. A non-transitory computer-readable storage medium, storing a computer program therein, wherein the computer program, when loaded and executed by a processor, implements the device discovery method according to claim 1.

12. A device discovery method, performed by a second device, the method comprising:

interacting with a first device by means of n management frames, at least one of the n management frames comprising a customized field, and n being a positive integer;

wherein the at least one of the n management frames comprises: a first management frame transmitted by the second device, and a customized field in the first management frame is configured to carry device information of the second device;

wherein the customized field comprises at least one information element, and a first information element in the at least one information element comprises:

a tag number subfield configured to identify the customized field;

a data subfield configured to describe content information of layer two information; and a data type subfield configured to identify a type of the layer two information.

13. The method according to claim 12, wherein the first information element in the at least one information element further comprises at least one of:

a length subfield configured to identify a length of the first information element; and an organizationally unique identifier subfield configured to identify a format standard corresponding to the first information element.

14. The method according to claim 13, wherein the interacting with the first device by means of the n management frames comprises:

receiving a second management frame broadcasted by the first device, layer two information carried in the second management frame being a device discovery request, and a type of the second management frame comprising: an action frame or a probe frame; and transmitting, in response to the second management frame, the first management frame to the first device, layer two information carried in the first management frame being a device discovery response, and a type of the first management frame comprising: the action frame or the probe frame.

15. The method according to claim 14, wherein, a value of a data type subfield corresponding to the device discovery request is a first value, and a data subfield corresponding to the device discovery request carries device information of the first device; and a value of a data type subfield corresponding to the device discovery response is a second value, and a data subfield corresponding to the device discovery response carries the device information of the second device.

16. The method according to claim 15, wherein the device information of the first device comprises:

first capability information configured to describe a provisioning capability of or a password synchronization capability of the first device.

17. The method according to claim 15, wherein the device information of the second device comprises at least one of:

second capability information configured to describe a provisioning capability of or a Pairwise Master Key (PMK) network connection capability of the second device;

state information configured to describe a provisioning state of the second device;

product identification information configured to describe a model of the second device or a vendor to which the second device belongs;

vendor data information configured to describe data customized by the vendor to which the second device belongs; and a random number configured to generate a shared key to encrypt networking information in a provisioning process.

18. The method according to claim 13, wherein the interacting with the first device by means of the n management frames comprises:

broadcasting the first management frame, layer two information carried in the first management frame being a device discovery response, and a type of the first management frame being a beacon frame.

19. The method according to claim 18, wherein a value of a data type subfield corresponding to a device discovery response is a second value, and a data subfield corresponding to the device discovery response carries the device information of the second device.

20. A first device, comprising:

a transceiver configured to interact with a second device by means of n management frames, at least one of the n management frames comprising a customized field, and n being a positive integer; and a processor configured to acquire device information of the second device based on the customized field in a first management frame, the first management frame being a management frame transmitted by the second device among the at least one of the n management frames;

wherein the customized field comprises at least one information element, and a first information element in the at least one information element comprises:

a tag number subfield configured to identify the customized field;

a data subfield configured to describe content information of layer two information; and a data type subfield configured to identify a type of the layer two information.

* * * * *